United States Patent [19]

DeBalko

[11] Patent Number: 4,529,847
[45] Date of Patent: Jul. 16, 1985

[54] MAINTENANCE TERMINATION UNIT

[75] Inventor: George A. DeBalko, Hanover Township, Morris County, N.J.

[73] Assignee: AT&T Bell Laboratories, Murray Hill, N.J.

[21] Appl. No.: 560,334

[22] Filed: Dec. 12, 1983

[51] Int. Cl.³ .............................................. H04B 3/46
[52] U.S. Cl. ............................................ 179/175.3 F
[58] Field of Search ................. 179/175.3 F, 175.3 R, 179/78; 324/95; 307/318

[56] References Cited

U.S. PATENT DOCUMENTS 4,396,809  8/1983  Brunssen ......................... 179/175.3
4,415,779 11/1983  Bowman ...................... 179/175.3 F
4,438,299  3/1984  Tomim ......................... 179/175.3 F Primary Examiner—Stafford D. Schreyer
Attorney, Agent, or Firm—Harry L. Newman

[57] ABSTRACT

A method and apparatus for locating faults in a transmission line as being on a customer side or a network side of the apparatus is disclosed. A maintenance termination unit (30) is described that includes a pair of normally open voltage sensitive switches (16) respectively connected in series with conductors (11,13) of a transmission loop (10) and a distinctive termination (23) connected between the conductors on the customer side of the switches. The distinctive termination includes a resistor (20) and oppositely disposed diode (18) zener diode (19) pair.

4 Claims, 2 Drawing Figures

MAINTENANCE TERMINATION UNIT

BACKGROUND OF THE INVENTION

1. Field of the Invention

This invention relates to transmission line fault locating systems and in particular to a method and an apparatus for determining on which side of a maintenance termination unit the fault is located.

2. Description of the Prior Art

It is becoming more and more important to find improved apparatus and methods for locating faults in a transmission line. This is especially important in the context of the telephone industry. In telephone transmission loops, many customers provide their own terminal equipment and install their own wiring.

Typically a problem arises in determining whether there is a service interrupting fault on the customer side of a network customer interface (NCI) or whether the fault has occurred on the network side of the NCI. Note that the NCI refers simply to a junction point between the telephone company and the customer. Typically, fault location is accomplished utilizing a device called a maintenance termination unit (MTU) in conjunction with signals from a remote test center.

It is also important to be able to determine whether there is actually an MTU on the transmission line in those environments where MTUs are only partially deployed. This capability makes it possible to distinguish the loops where fault location information can be obtained from those where it cannot. This capability is particularly desirable on loops where cable pair changes make MTU record keeping difficult. Previous maintenance termination units have several shortcomings: (1) they give an inaccurate count of the number of ringers connected to the transmission loop; (2) they cannot be distinguished from a tone ringer; (3) in the absence of record keeping, a loop with an MTU connected to it cannot be distinguished from an unequipped loop; (4) the termination cannot be used to verify the operation of the MTU, and finally (5) a power fault of sufficient magnitude at the MTU will cause the termination to open circuit. These deficiencies individually do not cause a severe problem but collectively they can present various problems in determining fault location.

What is needed, is a maintenance termination unit that overcomes the above-mentioned problems and also is a simple and reliable apparatus. In addition, the unit must be easily adaptable to transmission loops in general and, more particularly, to telephone transmission loops to readily ascertain the location of a service interrupting fault.

SUMMARY OF THE INVENTION

In accordance with an illustrative embodiment, the MTU comprises a pair of normally open voltage-sensitive switches respectively connected in series with a conductor pair of a transmission line and a distinctive termination connected across the conductor pair. The distinctive termination is located on the customer side of the switches and comprises an oppositely disposed diode-zener-diode pair that is connected in series with a high value resistor. The unit is advantageously located at the network customer interface (NCI).

The MTU, in conjunction with testing apparatus located at a maintenance center, provides the information necessary to determine fault location and also provides information as to whether there is an MTU on the conductor pair or not. The maintenance center by sending appropriate signals through the conductor pair can identify the presence or nonpresence of the MTU on the transmission line. The MTU by the signals passing through the distinctive termination also provides the means necessary to verify the operation of the MTU. The circuit arrangement of the distinctive termination also allows for counting the number of ringers on the transmission line up to 3, and is able to see a tone ringer.

To determine if the MTU is on the transmission line, the following procedure is followed. The testing apparatus, either a local Test Desk (LTD) or a Mechanized Loop Test (MLT) located at the maintenance center, applies a dc voltage across the conductors of a polarity to cause current flow through the diode. The dc voltage must be of a high enough level to both close the normally open switches and to break over the zener diode of the distinctive termination. When this level of voltage is applied, current flows through the switch on the one conductor, through the diodes and resistor of the distinctive termination, and through the switch located on the other conductor. Thus, in this polarity, there is current flow. But it is not constant because the switches repetitively close and open as a result of the path through the distinctive termination. Consequently, the test center receives an intermittent signal which is readily detected, such as by wiggling of a meter.

When the dc voltage is reversed, the current flow through the distinctive termination is blocked by the oppositely disposed diode. Thus, there is an open circuit in that direction. This combination of periodic current flow in one polarity and open circuit in the other provides the unique signature that indicates that there is an MTU on the conductor pair.

One procedure for determining fault location is as follows. First, a dc voltage is applied across the conductor pair that is greater than necessary to close the switches. If there is an indication of a fault, when the dc voltage is applied and reversed, then a dc voltage is applied that does not close the switches. If there is again an indication of a fault then the fault is on the network side of the MTU. If, on the other hand, there is no longer an indication of a fault, then the fault is on the customer side.

Previous MTUs distort the counting of the number of ringers from the maintenance center because they oftentimes look electrically like tone ringers and add a ringer to the sum. The MTU of the present invention due to the circuit arrangement of the distinctive termination does not look like a tone ringer electrically and, therefore, the telephone company can more accurately determine the number of ringers on the loop, up to 3, and can even distinguish a real tone ringer from an open circuit.

The distinctive termination, through its high value resistor, also prevents power surges from lightning and the like from causing the MTU to fail. The resistor of the distinctive termination is of high enough value to limit current flow therethrough. Thus, the MTU through the above-mentioned features provides a means to accurately and efficiently determine network continuity in a transmission line.

DETAILED DESCRIPTION

Figure 1:
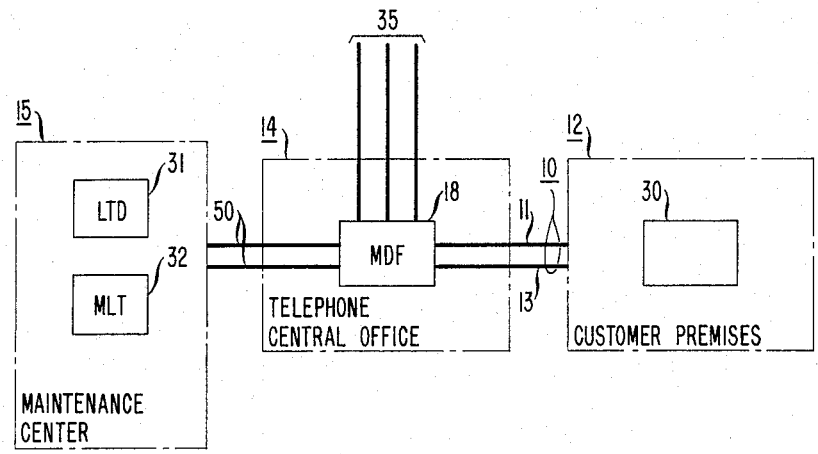
FIG. 1 is a schematic drawing showing the interconnection between a maintenance center, a telephone central office and a customer premises.

Referring to FIG. 1, a telephone loop 10 including conductors 11 and 13 is shown connecting a customer premises 12 with a telephone central office 14. At the customer premises 12, there is shown a maintenance termination unit (MTU) 30. A maintenance center 15 is shown that accesses the central telephone office 14 by test trunks 50. The test trunks 50 are typically a plurality of transmission lines that allow either a local test desk (LTD) 31 or a mechanized loop test apparatus (MLT) 32 located within the maintenance center 15 to perform specified tests on the telephone loop 10.

During normal telephone conversation, the main distributing frame (MDF) 18 of the telephone office 14 links the customer premises 12 with other customers (not shown) via lines 35. The maintenance center 15 is utilized when a customer reports a service interrupting fault on the telephone loop 10. The center 15 through either the LTD 31 or MLT 32 accesses the telephone loop 10 via the MDF 18 so that the loop can be tested to determine the location of the fault.

Figure 2:
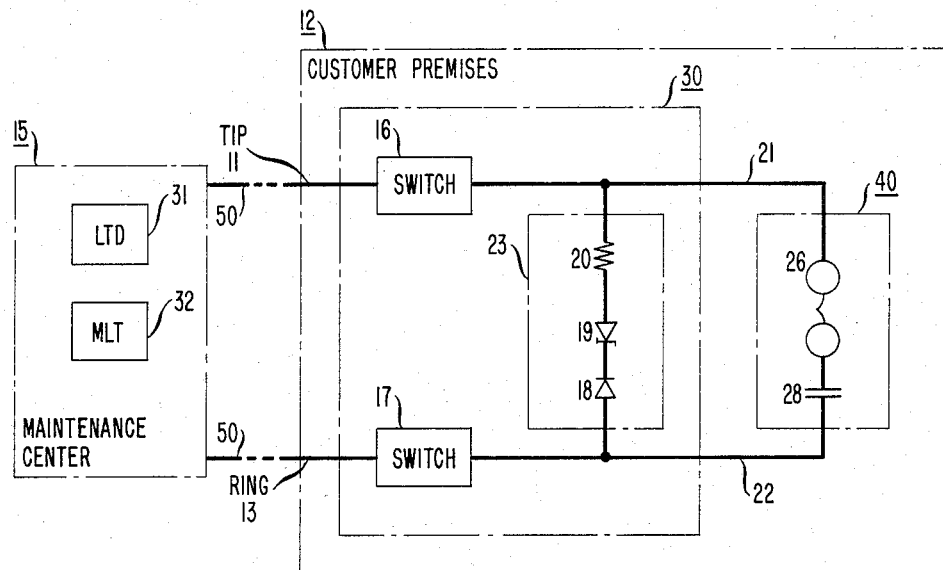
FIG. 2 is a schematic drawing showing the interconnection of a maintenance termination unit in accordance with the present invention.

FIG. 2 shows an embodiment of the MTU 30 of the present invention. For purposes of this description, the conductor 11 will be referred to as the tip conductor and the conductor 13 will be referred to as the ring conductor. The maintenance termination unit 30 comprises a pair of normally open voltage sensitive switches 16 and 17 respectively connected in series with the tip conductor 11 and ring conductor 13. The MTU 30 further comprises a distinctive termination 23 that is connected across the tip and ring conductors on the customer side of the switches 16 and 17. The termination 23 comprises a resistor 20, one end which is connected to tip conductor 11 and the other end which is connected to the anode of a zener diode 19. The cathode of diode 19, in turn, is connected to the cathode of a diode 18. The anode of diode 18 is connected to ring conductor 13. Thus, it is seen that the diode 18-zener diode 19 pair is connected in an oppositely disposed relationship to each other.

The preferred location of the MTU 30 is at the entrance of tip and ring conductors 11 and 13 to the customer's premises 12. The MTU 30 is placed adjacent to and on the customer's side of a protector block (not shown). Tip and ring conductors 21 and 22 within the customer's premises 12 connect terminal equipment such as a telephone set 40, which includes a ringer 26 and a capacitor 28, to the MTU 30. Thus, it is readily apparent that MTU 30 provides an interface between the network and the customer's premises.

Each voltage sensitive switch 16 and 17 acts in a binary manner. That is, when the switch is off, it presents a high impedance to its respective conductor, and when the switch is on, it presents a low impedance to the conductor. For a detailed understanding of the operation of a voltage-sensitive switch that can be utilized to perform the operation required of switches 16 and 17, reference is made to U.S. Pat. No. 4,396,809, issued Aug. 2, 1983 in the name of J. E. Brunssen. The details of the voltage-sensitive switch utilized in that disclosure are incorporated by reference herein.

During normal telephone operation, when the telephone set 40 goes off-hook, a battery (not shown) located at the central office 14 (FIG. 1) provides the voltage and current to allow for telecommunications. The threshold voltage for the two switches 16 and 17 is selected to be a little less than half the battery voltage. The battery voltage is usually 48 v, and thus the threshold voltage per switch is advantageously less than 20 v. This causes the switches 16 and 17 to turn on and therefore present a low impedance between the telephone set 40 and the central ofice when a path is provided between tip and ring conductors 21 and 22 by the telephone set 40 going off-hook. The battery voltage is not sufficient to operate the switches 16 and 17 without the telephone 40 going off-hook.

The distinctive termination 23, during normal telecommunications, presents a high impedance path between the tip and ring conductors 11 and 13 due to the presence of the oppositely disposed diode 18 and zener diode 19 pair. The zener diode 19 is selected to have a break-over voltage that requires more than the voltage remaining from the battery voltage after the voltage drops across the switches 16 and 17, and the diode 18 blocks all current flowing in the opposite direction. In the normal telco loop, the MTU is installed so that diode 18 is back biased to have the highest bridging impedance. Thus, a customer, when talking on the telephone 40, talks right through the switches 16 and 17 and the distinctive termination 23 is invisible.

The resistor 20 advantageously has a high enough value to allow the MTU 30 to revert to a high impedance state if a transient condition, such as lightning or the like, causes the switches 16 and 17 to momentarily operate. In addition, the resistor in combination with the switches 16 and 17 provide a unique signature that identifies the presence of the MTU 30 on the line.

To determine whether the MTU 30 is present, the LTD 31 or the MLT 32 located at the maintenance center 15 is connected to the tip and ring conductors 11 and 13. A dc voltage is then applied that is sufficient to both close the switches 16 and 17 and break over the zener diode 19 of the distinctive termination 23. If the MTU 30 is present, when the polarity of the voltage is positive with respect to the ring conductor 13, there is current flow through the switch 17 in the ring conductor, through diode 18, zener diode 19 and resistor 20 of the distinctive termination 23, and then through the switch 16 in the tip conductor 11 back to the maintenance center 15. Because of the high value of the resistor 20, the switches 16 and 17 will respectively close and open. A periodic dc signal is thereby produced that is distinctive and readily detected at the maintenance center 15. When the polarity of the voltage is reversed, there is no current flow because of the diode 18. This combination of outputs indicates the presence of the MTU 30.

When the subscriber loop is reported to be faulty it becomes necessary to determine whether the fault is located on the customer's side or the network side of the MTU 30. Once a determination is made as to where the fault is located, an appropriate repair person can be assigned to correct the fault. Alternatively, if the customer owns the wiring and terminals on his side of the MTU 30, the aforesaid fault locating fixes the responsibility for correcting the fault.

In testing for a fault from the LTD 31, a high dc voltage (typically 100 volts) through 100K ohms is applied by a service person across the conductor pair 11 and 13 with one polarity. Thereafter, the polarity of the voltage is reversed. If there is a customer fault from tip 21 to ring 22, then the periodic signal will be observed with both polarities. If there is a network fault from tip 11 to ring 13 that is hard (i.e., less than 100K ohms), a steady signal will be observed with both polarities. If the network fault is light (i.e., greater than 100K ohms), then in one polarity of voltage, the periodic signal will be observed and in the other polarity, the steady signal will be observed.

Should no fault be detected by application of the high dc voltage across tip and ring conductors 11 and 13, then the voltage is applied from tip to ground and from ring to ground. If there is a customer fault from tip 21 to ground or ring 22 to ground, then the periodic signal will be observed when the voltage is applied to the associated conductor. If there is a network fault from tip 11 to ground or ring 13 to ground, then the steady signal will be observed when the voltage is applied to the associated conductor.

The MLT 32 utilizes a slightly different procedure to determine fault location on the line. A high dc voltage (typically 70 v), is applied to the tip and ring conductors 11 and 13 first in one polarity and then in the other. In each instance, the switches 16 and 17 are turned on, and if there is a fault on the line anywhere, current flow is detected at the MLT 32 in both polarities. The step of applying the voltage is done on the order of milliseconds, automatically by the MLT 32. At this point a fault on the loop 10 has been determined, but the location of the fault has not been fixed.

The next step in the procedure is to provide a minimal dc voltage (typically 10 volts) to the conductors 11 and 13 that is below the operating threshold of the switches 16 and 17. If current flow is detected at the MLT 32 which is equal in proportion to the current flow observed when the higher voltage was applied, then the fault is on the network side of the MTU 30. If, on the other hand, the current flow in proportion to the high current significantly decreases when the minimal voltage is applied, the fault is on a customer side of the MTU 30.

It should be understood that the test procedures previously discussed along with their associated voltage values are not limited thereto. There are variations of these procedures which one skilled in the art could devise and still be within the spirit and scope of my invention. Similarly, it is clear to those skilled in the art that the voltages required to turn on the switches 16 and 17 or to provide break-over voltage for the zener diode 19 are not limited to those herein described. Finally, it is also clear, that the value associated with resistor 20 of the distinctive termination 23 is not limited thereto.

In all cases it is to be understood that the above-described embodiment is illustrative of one of many possible specific embodiments which may represent the principles of my invention. Numerous and various other embodiments can be devised readily in accordance with these principles by those skilled in the art without departing from the spirit and scope of my invention.

What is claimed is:

1. A maintenance termination unit adapted to be connected to a tip conductor and a ring conductor connecting a central office with a customer premises, the maintenance termination unit comprising:
   first and second normally open switching means adapted to be respectively connected in series with the tip and ring conductors; and
   distinctive termination means adapted to be connected between the tip and ring conductors on the customer premises side of the first and second switching means, the distinctive termination means comprising a resistor connected in series with a unidirectional conducting device and a voltage break-over device, the unidirectional conducting device and voltage break-over device being connected in an opposed relationship.

2. A fault locating circuit for a transmission line comprising first and second conductors connecting a first location with a second location, the locating circuit for determining whether the fault is on the first location side or the second location side of the locating circuit, the locating circuit comprising:
   first and second switching means; and
   a distinctive termination connecting the first switching means to the second switching means, the distinctive termination comprising resistor means connected in series with means for permitting current flow responsive to voltage of a first polarity above a particular threshold and preventing current flow responsive to voltage of the opposite polarity;
   the fault locating circuit when connected to the transmission line having the first and second switching means respectively connected in series with the first and second conductors and the distinctive termination connected between the conductors.

3. A maintenance termination unit connected to a telephone loop comprising tip and ring conductors extending between a central office and a terminal on a customer's premises, the maintenance termination unit serving to determine whether a fault in the loop is on the central office side or the terminal side of the maintenance termination unit, the maintenance termination unit comprising:
   first and second normally open voltage sensitive switches respectively connected in series with the tip and ring conductors; and
   a termination connected between the tip and ring conductors on the terminal side of the first and second switches, the termination comprising a serially connected high value resistor, unidirectionally conducting device, and voltage break over device, the unidirectional conducting device and the voltage break over device being connected in an opposed relationship.

4. A maintenance termination unit as in claim 3 wherein the value of the resistor is such that when the terminal is not connected to the loop, application of a voltage sufficient to close the switches and break over the voltage break over device and of a polarity to cause current flow through the unidirectional conducting device results in intermittent operation of the switches.

* * * * *